April 14, 1970   J. HARTMANN   3,506,825
ORBITING TYPE IRRADIATION DEVICE WITH ROTARY SLUICE MEANS
Filed Sept. 27, 1966   3 Sheets-Sheet 1

Inventor:
JURG HARTMANN
BY
Kenyon & Kenyon
ATTORNEYS

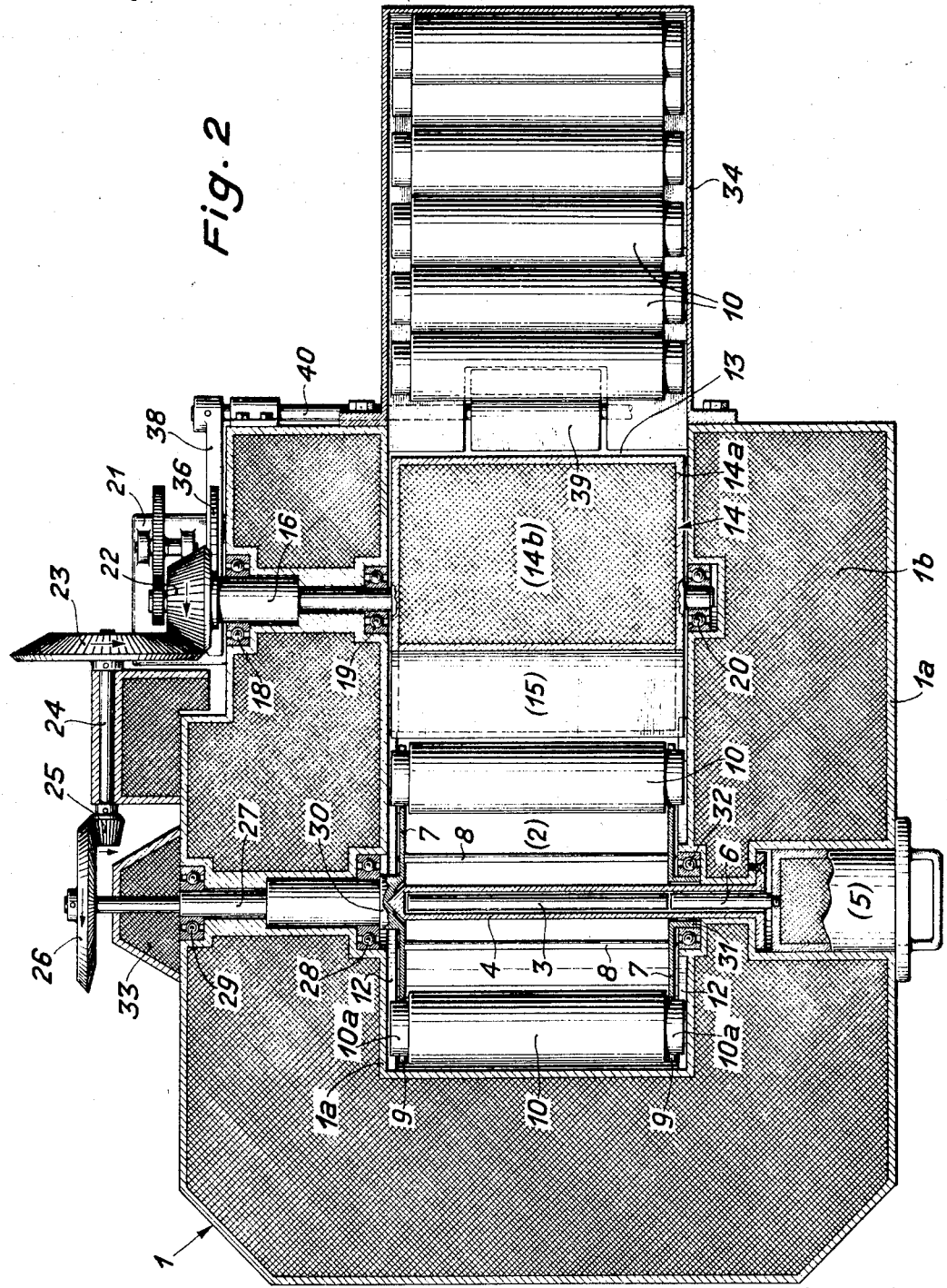

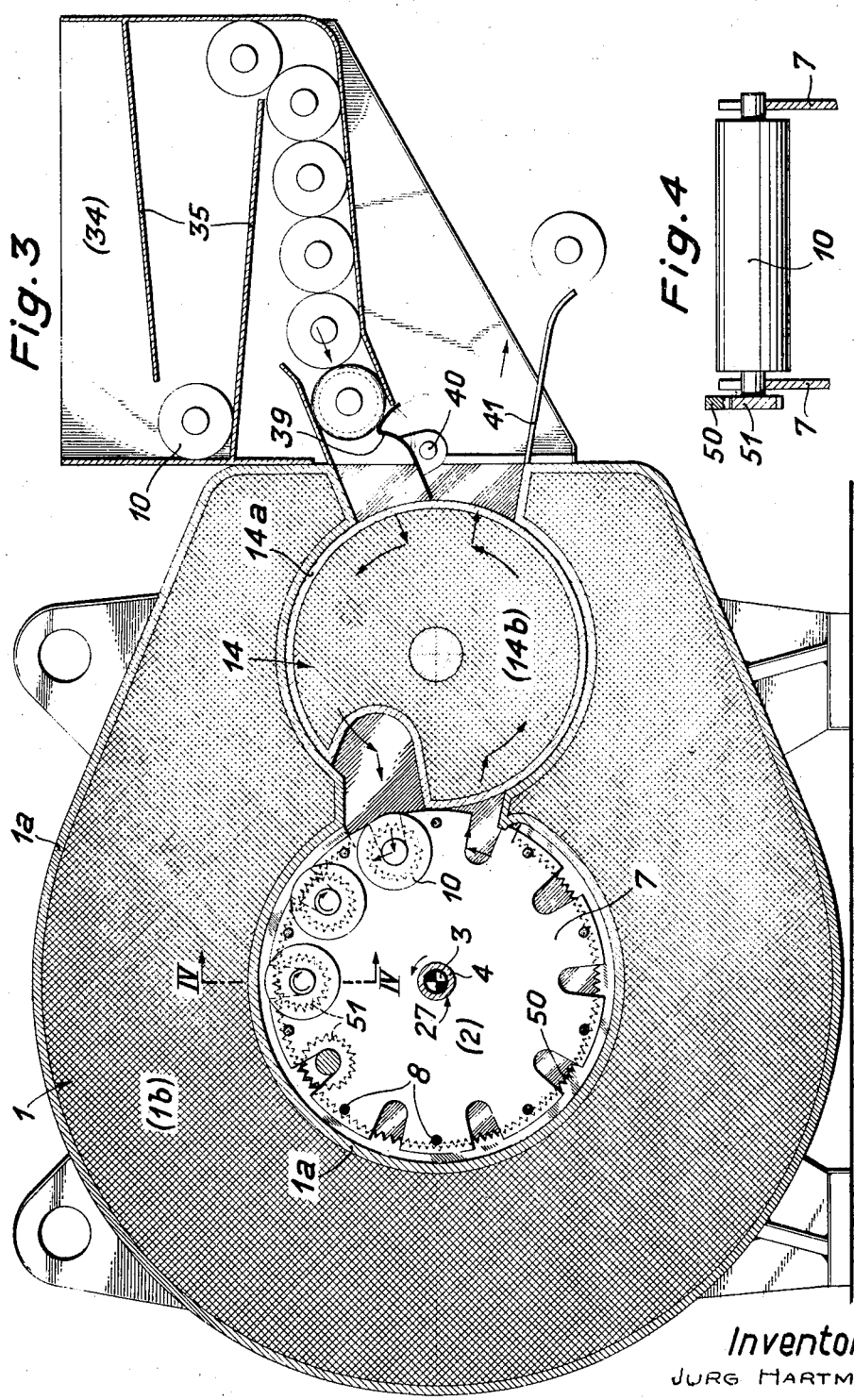

United States Patent Office 3,506,825
Patented Apr. 14, 1970

3,506,825
ORBITING TYPE IRRADIATION DEVICE WITH ROTARY SLUICE MEANS
Jurg Hartmann, Dietikon, Zurich, Switzerland, assignor to Sulzer Brothers Limited, Winterthur, Switzerland, a corporation of Switzerland
Filed Sept. 27, 1966, Ser. No. 582,316
Claims priority, application Switzerland, Oct. 5, 1965, 13,735/65
Int. Cl. G01n 23/20, 21/00; H01j 37/20
U.S. Cl. 250—52                                    12 Claims

ABSTRACT OF THE DISCLOSURE

The loads to be irradiated are fed by the rotary sluice which seals off the radiation chamber in sequence into successive slots of the slotted wheel rims. The fixed tracks cause the loads to rotate on their own axes during orbiting about the radiation source to obtain uniform irradiation. The loads are returned to the sluice and led out of the radiation chamber.

---

This invention relates to an irradiation apparatus. More particularly, this invention relates to an irradiation apparatus for conveying goods to be irradiated in a circular path about a central radiation source.

It has been known to irradiate goods, such as potatoes, by means of rotating devices constructed in the manner of a Russian wheel. In such a case, individual loads have been pushed on rocking platforms and, by means of supplying and removing devices set perpendicular to the plane of transportation, have been moved into a circular path for an irradiation treatment and removed from the circular path after irradiation. This has been necessary since the loads require at least one complete revolution around the irradiation source in order to subject the side and top surfaces to irradiation for equal periods of time. However, uniform irradiation is not obtained at all points of the circular path around the irradiation source as the parts of the goods adjacent the lower surfaces resting on the platforms receive a smaller dose of radiation than the upper parts.

Briefly, this invention provides an irradiation apparatus having a central source of radiation, a rotatable means for conveying the goods to be irradiated in a circular path about the source of radiation and a stationary rotation-imparting means positioned relative to the rotatable means to impart a rotational movement to the conveyed goods about an axis parallel to the circular path during conveyance of the goods in the circular path for purposes of obtaining uniform irradiation. In order to facilitate the invention, the goods are enclosed within cylindrical containers to form a plurality of individual loads to be fitted into the rotatable means for conveyance in the circular path. While the containers are generally circular in shape for ease of handling, the term cylindrical is intended to also define containers of prismatic shape with polygonal bases.

The rotatable means is constructed of at least a pair of wheel rims having a star-like or slotted configuration to form a series of circumferentially spaced recesses for receiving individual loads. The wheel rims are rotated at a determined rate in unison to convey the loads through an irradiation zone in a circular path. The loads are also rotated about axes parallel to the circular path at a rate related to the rate in the circular path so that all the generatrices of the containerized loads become exposed with equal frequency and for equal time to direct radiation from the radiation source. This permits a completely uniform irradiation of the containerized goods to be obtained.

The loads are advantageously rotated a number of times on an axis of rotation which runs parallel to the generatrix lines and preferably through the center of gravity. The number of rotations made during the irradiation time, which will be designated by $k$, is determined by the ratio of the diameter $R$ of the circular path of the containers to the diameter $r$ of the container rotating in the wheel rims, or of a rotational element associated with the container, multiplied by the factor $\alpha/2\pi$. $\alpha$ designates the angle over which each load moves in traveling along the circular path. This relationship is thus represented by the formula $k=R/r\cdot\alpha/2\pi$. In the case of a closed circular path, the factor $\alpha/2\pi$ thus becomes equal to 1. For a low number $k$ of rotations care should be taken that the magnitude $k$ is at least approximately a whole number, for greater values of $k$, $k>20$ for example, this approximation is no longer necessary for uniform irradiation.

The dimensions of the individual structural elements are made such that each generatrix of the individual loads during circulation, that is, from the place of deposit to the place of removal, shall come at least once to the least possible distance from the cylindrical source of radiation. By the term cylindrical source of radiation is meant a source such as to produce a cylindrical radiation field. The source of radiation itself can thus, for example, consist of a number of rods.

In order to deposit the loads into and remove the irradiated loads from the respective recesses of the wheel rims, a rotary valve, or rotary sluice, means is disposed adjacent the wheel rims. The rotary valve, or rotary sluice, means is provided circumferentially with at least one peripheral groove for receiving a load for an external source and conveying the load in an arcuate path to the wheel rim. Upon further rotation, the rotary valve receives an irradiated load for transportation out of the irradiation zone.

Accordingly, it is an object of the invention to provide an irradiation apparatus for uniformly irradiating goods.

It is another object of the invention to provide an irradiation apparatus for uniformly irradiating goods with an irradiation dose contained within narrow upper and lower limits.

It is another object of the invention to provide an irradiation apparatus which uses a minimum source of radiation.

It is another object of the invention to provide an irradiation apparatus of minimum space and weight.

These and other objects and advantages of the invention will become more apparent from the following detailed description and appended claims taken in conjunction with the accompanying drawings in which:

FIGS. 1 and 2 illustrate in vertical and horizontal sections respectively a portion of an irradiation apparatus of the invention which show the irradiation zone a rotary valve and a load supply means;

FIG. 3 illustrates a modified form of construction of an irradiation apparatus of the invention in vertical section; and FIG. 4 illustrates a view taken on line IV—IV of FIG. 3.

Figure 1:
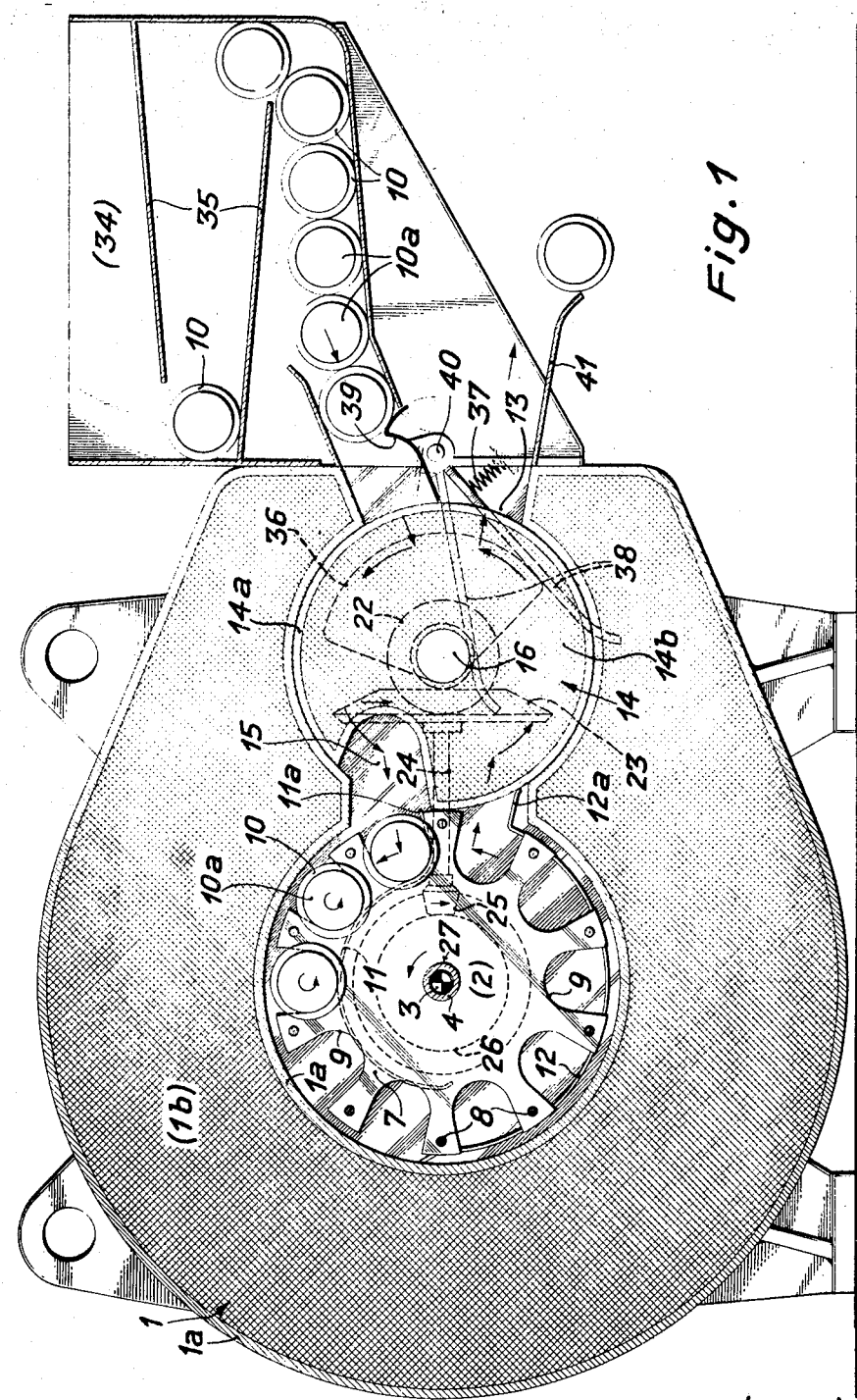

Referring to FIGS. 1 and 2 which are schematic in part, an irradiation apparatus includes a radiation-absorbing unit 1 having an internal irradiation zone 2 in which a cylindrical source of radiation 3, for example, cobalt 60, is disposed within a casing 4. The unit 1 consists of a steel housing 1a which is lined internally with a radiation-absorbing material, such as lead, and which is apertured on one side for the insertion and removal of the source of radiation 3. A slide 5 which is made of lead and surrounded by a steel covering is received in the aperture of the housing 1a to seal the housing. A bolt 6, for example, of depleted uranium, is screwed into the end of the slide 5 to project into the casing 4 to close off the source of radiation 3. The casing 4 is formed with a flanged end which abuts the wall of the housing 1a adjacent the slide 5 and which is detachably connected to the wall, for example, by a screw.

A rotatable means is disposed concentrically about the casing 4 within the irradiation zone 2 and includes a pair of rotatable wheel rims 7 which are connected to one another by rods 8 parallel to the casing 4. Each wheel rim 7 is formed in star-like or slotted manner with a plurality of circumferentially spaced laterally open recesses 9 and arranged to receive cylindrical containers 10 in parallel disposition to the radiation source 3. The cylindrical containers 10 have trunnions at each end which pass into the recesses 9 and collor-like extensions 10a which are disposed outside the wheel rims 7.

The containers 10 contain the goods to be irradiated, for example, for biological or medical purposes, in a sealed manner.

A stationary rotation imparting means is disposed along the walls of the irradiation zone 2 and includes two guide surfaces 11, 12 of semi-circular shape which are disposed outside the casing 4 of the wheel rims 7 above and below the axis of the casing 4 so that the collar-like extensions 10a of the containers 10 roll on each guide surface in sequential manner to cause the containers to rotate counterclockwise in an upper zone above the casing and clockwise in a lower zone below the casing as viewed in FIG. 1. The guide surfaces 11, 12 can be roughened by suitable mechanical treatment or by using suitable material to ensure that the friction between the guide surfaces 11, 12 and extensions 10a is substantially greater than the friction between the trunnions and walls of the recesses 9.

The radiation-absorbing unit 1 has an entrance 13 to the irradiation zone 2 in which a rotary valve, or rotary sluice, means 14 is disposed. The rotary valve, or rotary sluice, means 14 includes a steel shell 14a which is lined internally with a cast-on lead lining 14b and formed with a groove 15 for receiving a container 10. The shell 14a is fixedly mounted on a shaft 16 which is journaled in ball bearings 18, 19, 20 and driven by a drive motor 21 in synchronism with the wheel rims 7. The shaft 16 is provided at one end with a bevel wheel 22 which is splined thereon and which is in engagement with a bevel wheel 23 of a shaft 24 mounted in the unit 1. The other end of shaft 24 has a bevel wheel 25 secured thereon which drives a bevel wheel 26 mounted on a drive shaft 27 of the wheel rims 7. The drive shaft 27 which is mounted in ball bearings 28 and 29 in the unit 1 is fastened to a shaft support 30 of one wheel rim 7; while a hollow shaft stub 31 of the other wheel rim is mounted in a ball bearing 32. The passage of the shaft 27 to the exterior of the housing 1a is shielded by a shield 33. As shown in FIG. 1, the turning of the wheel rim 7 and the rotary valve or sluice 14 are in a counterclockwise direction. However, another form of construction could, for example, consist in the wheel rims being driven directly and the rotary valve or slice being operated intermittently. In the case of the present form of construction, by means of the bevel-gear drive 22, 23 25 and 26, the ratio of the revolutions of the rotary valve to those of the wheel rims 7 is determined in such a way that the loads 10 which are brought individually by the rotary valve or sluice to the wheel rims become fed one after the other into the sequence of recesses 9. In the example of construction, the ratio is thus 10:1.

The containers 10 are supplied to the irradiation apparatus by rolling out of a magazine 34 onto a zigzag path 35 forming a self-conducting runway to the rotary valve 14. In order that only one container at a time may be brought into a position for reception in the recess 15 of the rotary valve, the rotary valve is provided with a control device for arresting rolling of the following containers. The control device consists in a cam 36 fastened on the drive shaft 16 against which a lever arm 38 loaded by a spring 37 slides. The lever arm 38 is connected to a holding element 39 which forms a rotatable portion of the the runway 35 and is mounted with that element on a shaft 40.

In operation, the magazine 34 is filled with loads so that the lowermost load remains arrested by the holding element 39. The wheel rims are then driven at a constant speed, which depends on the radiation dose desired, so that both the wheel rims and the rotary valve turn counterclockwise. The lever arm 38 then slides against the cam 36 until it arrives in the position shown in FIG. 1 by dot-dash lines. The foremost cylindrical container, released by the holding element 39, now rolls one diameter downward. Then the lever arm 38 is moved clockwise under the force of spring 37 so that the second and subsequent loads become arrested by the holding element 39, while the first container now rolls into position to be received by the recess 15 of the rotary valve. As the valve turn, the container is deposited into the recesses 9 of the wheel rims by rolling over a feed branch 11a of the guide surface 11. While nine additional containers are subsequently deposited, as through a lock, into the recesses 9 of the wheel rims, the first container is moved in a circular path around the source of radiation 3 while simultaneously rolling along the guide surface 11 and 12. The goods in the container thus are irradiated uniformly around the entire circumference. Finally, the irradiated container rolls onto a roll-out branch 12a of guide surface 12 which is at that instant opposite the recess 15 of the rotary valve, and is transported by the valve by rolling upon an inclined path 41 below the valve to a magazine (not illustrated).

The form of construction of the invention shown in FIGS. 3 and 4 is, except for a variant design of the rotation imparting means and a correspondingly modified form of the co-operating containers, similar to that of FIGS. 1 and 2. Therefore the structural elements that correspond are shown only in a very schematic way.

The rotation imparting means of FIGS. 3 and 4 consists of ring gear 50 mounted fixedly in an interior of the unit 1 near one of the wheel rims 7 to cooperate with the individual containers 10 each of which is provided at the end of a trunnion with a gear wheel 51 which engages in the ring gear 50. The gear wheel drive formed in this way replaces the two guide paths 11 and 12 described above and further permits the containers 10 to be turned in a positive manner so that uniform irradiation of the contained goods is insured with certainty.

While the invention has been described in terms of conveying the containerized loads around a source of radiation in a vertical transportation plane and in a single revolution, it is noted that the invention can be applied to installations having rotatable means with one or more vertical or horizontal transportation planes. Furthermore, the goods may be deposited and removed from the same plane as the transportation plane. Also, a number of rotatable means can be disposed near each other to convey the loads about a single source of radiation in a plurality of transportation planes from entry into the irradiation zone to emergence.

Having thus described the invention, it is not intended that it be so limited as changes may be readily made therein without departing from the scope of the invention. Accordingly, it is intended that the subject matter described above and shown in the drawings be interpreted as illustrative and not in a limiting sense.

What is claimed is:
1. An irradiation apparatus comprising
 a central source of radiation having a horizontal disposed axis;
 a housing unit having a radiation-absorbing lining disposed about said source of radiation in spaced re- lation and an aperture leading to said source of radiation;

rotatable means mounted within said lining of said housing unit for conveying goods to be irradiated in a vertically disposed circular path about said source of radiation, said rotatable means mounted co-axially of said source of radiation for engaging and conveying containers having the goods to be irradiated therein;

a rotary sluice means mounted within the aperture of said housing unit for radially introducing and removing the containers to and from said rotatable means under gravity, said rotary sluice means being of a radiation-absorbing material and including a groove for receiving each container therein in sequential order.

2. An irradiation apparatus as set forth in claim 1 wherein said rotatable means includes a pair of spaced parallel wheel rims, each of said wheel rims includes a series of circumferentially spaced recesses in the periphery thereof for receiving the containers therein.

3. An irradiation apparatus as set forth in claim 1 further comprising a stationary rotation imparting means fixed within said housing and positioned relative to said rotatable means for engaging the containers therein and having a surface thereon for rotating each container about the axis thereof during conveyance about said source of radiation.

4. An irradiation apparatus as set forth in claim 3 wherein said stationary rotation imparting means includes a ring gear disposed adjacent said rotatable means concentric to said path.

5. An irradiation apparatus as set forth in claim 1 further comprising means for synchronizing rotation of said rotary sluice means and said rotatable means.

6. An irradiation apparatus comprising
a central source of radiation;
a rotatable means for conveying goods to be irradiated in a path about said source of radiation; and
a stationary rotation imparting means positioned relative to said rotatable means for imparting a rotational movement to the conveyed goods about an axis thereof during conveyance of the goods in said path, said stationary rotation imparting means including two guide surfaces disposed in sequential manner along said path, one of said guide surfaces being disposed in an upper zone above said source of radiation for imparting a counterclockwise rotation to the goods and the other of said guide surfaces being disposed in a lower zone below said source of radiation for imparting a clockwise rotation to the goods.

7. In combination with a series of containers having goods to be irradiated therein; and irradiation apparatus comprising a central source of radiation, a housing unit having a radiation-absorbing lining therein disposed in spaced relation about said source of radiation and an aperture therethrough leading to said source of radiation, rotatable means mounted within said housing unit lining for conveying said container in a circular path about said source of radiation and including a pair of spaced parallel wheel rims rotatably mounted coaxially of said source of radiation, each of said wheel rims having a series of circumferentially spaced recesses in the periphery thereof each recess being sized to receive a respective one of said containers, stationary rotation imparting means positioned relative to said wheel rims to project into engagement with the containers received in said wheel rims to rotate each container about the axis thereof relative to said wheel rims, and a rotary sluice means of radiation-absorbing material mounted in the aperture of said housing unit and including a peripheral groove therein sequentially receiving at least one container therein for delivery to said wheel rims and subsequently receiving said one container from said wheel rims for removal of said one container from said housing unit.

8. The combination as set forth in claim 7 wherein said rotary sluice means is rotated in synchronism with said wheel rims.

9. The combination as set forth in claim 7 wherein said stationary rotation imparting means includes two guide surfaces disposed in sequential manner along said path, one of said guide surfaces being disposed in an upper zone above said source of radiation for imparting a counterclockwise rotation to the goods and the other of said guide surfaces being disposed in a lower zone below said source of radiation for imparting a clockwise rotation to the goods and each said container includes a collar-like extension on each end, one of said collar-like extensions rolling on said guide surfaces.

10. The combination as set forth in claim 7 wherein said stationary rotation imparting means includes a ring gear disposed adjacent said rotatable means concentric to said path and each said container includes a gear wheel engaging said ring gear for positive rotation thereby.

11. The combination as set forth in claim 7 wherein said rotatable means includes at least two spaced parallel wheel rims, each of said wheel rims having a series of circumferentially spaced recesses in the periphery thereof for receiving said container, and each said container includes a trunnion at each end received in a respective recess of said wheel rims and a collar-like extension on each trunnion for engaging said stationary rotation imparting means.

12. The combination as set forth in claim 7 wherein each said container is cylindrical in shape.

References Cited

UNITED STATES PATENTS 3,225,203   12/1965   Gombert _____ 250—106

RALPH G. NILSON, Primary Examiner

S. C. SHEAR, Assistant Examiner

U.S. Cl. X.R.

99—217